United States Patent
Kloosterman (10) Patent No.: US 12,434,061 B2
(45) Date of Patent: Oct. 7, 2025

(54) SUTURELESS ANCHORING MODULE AND METHOD FOR FIXING THE MODULE IN A PATIENT

(71) Applicant: Esteban Martin Kloosterman, Boca Raton, FL (US)

(72) Inventor: Esteban Martin Kloosterman, Boca Raton, FL (US)

( * ) Notice: Subject to any disclaimer, the term of this patent is extended or adjusted under 35 U.S.C. 154(b) by 488 days.

(21) Appl. No.: 17/514,161

(22) Filed: Oct. 29, 2021

(65) Prior Publication Data
US 2023/0136800 A1   May 4, 2023

(51) Int. Cl.
*A61N 1/375* (2006.01)
*A61N 1/39* (2006.01)

(52) U.S. Cl.
CPC ..... *A61N 1/37518* (2017.08); *A61N 1/37512* (2017.08); *A61N 1/3754* (2013.01); *A61N 1/39622* (2017.08)

(58) Field of Classification Search
None
See application file for complete search history.

(56) References Cited

U.S. PATENT DOCUMENTS

| | | | |
|---|---|---|---|
| 8,909,348 B2 | 12/2014 | Fritsch et al. | |
| 2007/0239242 A1 | 10/2007 | Graubert et al. | |
| 2008/0046054 A1* | 2/2008 | Hjelle | A61N 1/0558 600/377 |
| 2008/0065203 A1 | 3/2008 | Khalapyan | |
| 2010/0109322 A1* | 5/2010 | Zavattieri | F16L 33/02 285/381.2 |
| 2011/0071590 A1* | 3/2011 | Mounaim | A61N 1/36007 607/41 |
| 2011/0270340 A1 | 11/2011 | Pellegrini et al. | |
| 2012/0277819 A1* | 11/2012 | Cowley | A61N 1/36053 607/45 |
| 2020/0360065 A1* | 11/2020 | Wenzel | A61B 17/82 |
| 2020/0367945 A1* | 11/2020 | Semingson | A61B 17/8861 |

* cited by examiner

*Primary Examiner* — Erica S Lee
(74) *Attorney, Agent, or Firm* — Norris McLaughlin, PA (57) ABSTRACT

A sutureless anchoring module for implanting medical devices in the body of a patient, comprising a main housing head provided with a housing to receive the device, a secondary closing head having two unidirectional locking holes, a first tie attached to the main housing head and that passes inside and locks in one of said unidirectional locking holes to fix said device and a second tie attached to the main housing head and that passes inside and locks in the other of the unidirectional locking holes, to hold on to a part of the patient's body. A method of implantation of said anchoring module is also provided.

12 Claims, 6 Drawing Sheets

Fig. 1

Prior Art

Fig. 2

Prior Art

SUTURELESS ANCHORING MODULE AND METHOD FOR FIXING THE MODULE IN A PATIENT

STATE OF THE ART OF THE INVENTION

Field of the Invention

The present invention relates to the field of medicine dedicated to the installation and/or implantation of control and/or treatment devices such as catheters and leads, especially but not limited to, the invention relates to the anchoring of leads related to implantable cardiac devices, such as pacemakers and/or defibrillators. The invention particularly relates to an installation method and anchoring module for installing or fixing catheters and leads necessary for the operation of said devices.

The module of the invention does not require suture, typically used for this purpose, so that it facilitates anchoring in an easy, rapid and practical way, doing so with consistently predictable results regardless of the operator. Thus, it allows to optimize the times of the surgical intervention quickly and easily, reducing the related postoperative risks, for example the damage of the lead by the suture with too much tension or displacement of the lead from its implant site due to lack of adequate tension. In this sense, a mechanism is provided for the implantation of said anchoring module in order to avoid the use of sutures and the excess or lack of adjustment of the leads and/or catheters with its consequent postoperative problems.

Although in the present description reference is made to a sutureless implant module for pacemakers and defibrillators, it should be clear that the present invention can be used to implant externally or internally any device, whether medical or not, in the body of a patient, be it a human or animal body, for any purpose.

DESCRIPTION OF THE PRIOR ART

Figure 1:
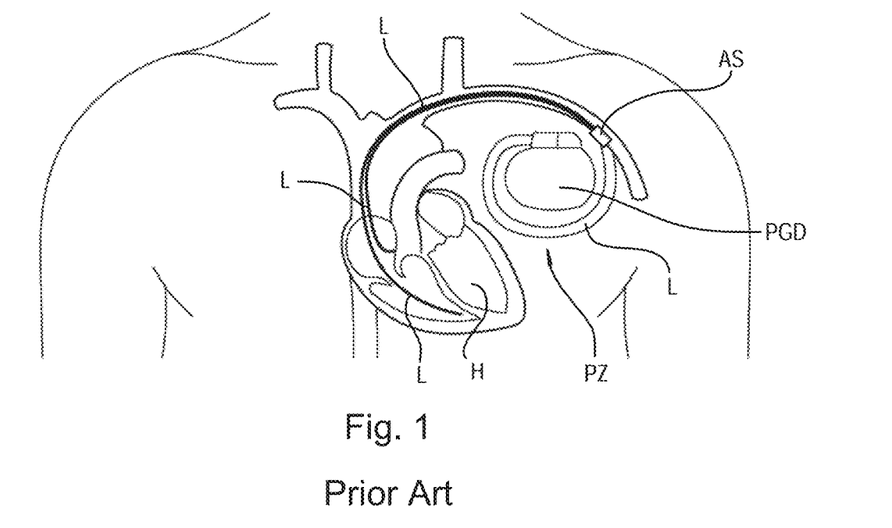
FIG. 1 shows a partial and exemplary view of a pectoral subclavicular zone of the human body in which a device, such as a pulse generator, is conventionally implanted in accordance with the prior art.

The use of pacemakers and defibrillators for the treatment of problems with the cardiac electrical conduction system or irregularities of the heart rhythm, "heartbeat", is widely known. According to FIG. 1 related to the prior art, pacemakers usually comprise a pulse generator device "PGD" provided with an electrical circuit that regulates the frequency of electrical impulses sent to the heart "H", being powered by a battery and connected to the heart using flexible "L" leads. The L leads sense and send electrical impulses that adapt or adjust to the heart rate to regulate it and in case of detecting, for example, beats that are too slow, the pacemaker sends the corresponding electrical signal to the heart H to correct them to the minimum pre-established rate for each patient.

The defibrillator on the other hand has all the pacemaker functions but in addition has the ability of detecting and treating life-threatening arrhythmias. The PGD of the defibrillator is somewhat larger than that of the pacemaker but the overall implantation technique is the same.

The implantation of a pacemaker or related device is a procedure that must be carried out in a surgical environment and can be performed under local anesthesia with or without conscious sedation. The L leads are placed in most cases through a venipuncture below the clavicle and, through this, guided by X-ray imaging (fluoroscopy) they are directed towards the H heart to be implanted in the right ventricle and also in the right atrium, in case of be a dual chamber pacemaker. Thus, the PGD pulse generator is placed in the PZ pectoral zone, most often on the left, in a subcutaneous pocket.

Likewise, all pacemaker and defibrillator L leads that connect to the heart H require a muscle attachment mechanism so that they do not disengage from their attachment to the heart. The L leads have an anchoring mechanism to the heart H itself at their tip in contact with the heart muscle and at the other end they have a connector to the device (pacemaker/defibrillator) that is inserted into a specific housing and is fixed with a screw. Between these two fixation points there is a third anchoring point at the lead entry in the vein access, which has historically been made with a silicone "AS" "sleeve", "cuff" or "sheath" (sleeve) which is placed over the L lead and attached to the muscle with a nonabsorbable suture.

This type of suture anchoring has been used until today virtually unchanged since the beginning of cardiac device implants. The AS sleeve or sheath should be attached to the lead to subsequently anchor the lead to the muscle (floor) of the pocket and to prevent it from moving and from slipping out of place. The sleeve AS does this by gripping the body of the lead L and holding it down to the pocket floor PF via sutures. About six weeks following implantation, a robust layer of scar tissue forms around the device and the adjacent lead which is termed as the capsule of the pocket. This layer holds down the device and prevents it from migrating along the tissue planes of the chest wall. It also envelopes the leads and prevents them from moving. Therefore, the role of the sleeve is to hold the leads until the enveloping layer of tissue is formed around the lead.

It should be remembered that the method or operation of suturing the sleeve includes two steps: holding the sleeve around the lead and suturing it to the pectoral muscle, that is, the muscle bite. From a practical point of view, the most important factor in a sleeve is that of the material from which it is made. The stiffer the material, the higher the chance of non-tightening of knots and slippage of suture. As a counterpart, too much softness puts the integrity of the lead at risk with the pressure of the suture.

However, each sleeve comprises a hollow tube through which the leads passes, and has grooves in the sleeve body to place the sutures. Some manufacturers' sleeves or cuffs have "wings" to provide additional sutures. Special care shall be taken with certain cuffs as they require significant knot force to hold the strap in place.

After being ready for performing suture, the sleeve, cuff, or sheath should slide down to the practiced pocket base. Sometimes the sleeves stick to the body of the lead and require a bit of moistening with a damp swab to slide freely. The sleeve consists of a cylindrical tube and grooves along the tube to tie the sutures. The sleeve should be positioned so that the end closest to the pocket floor or base disappears into the depth of the pocket. If there are three grooves, one groove should not be visible, that is, it should be located deep into the cavity floor. If there are only two grooves, both should be visible, but one only on the cavity floor.

The softness of the sleeve material determines the type of suture material required and the strength of the knot. The role of the sleeve is to fix the lead to the pocket floor or base to prevent it from moving from its initial location determined at the time of implantation. Sliding can occur due to the traction of the device or the movements practiced by the patient. If sufficiently pulled out, the lead may dislodge from the myocardium with loss of capture. In extreme cases, the entire lead may get pulled out into the pocket which is known as Twiddler syndrome.

In the state of the art, a variable method is currently used that depends on the need for stability of the lead against the risk of infection of the sutures retained for a long time. If the stability of the lead is questionable, for example in the worst case, an obese woman with a St. Jude sleeve, Ethibond 3/0 suture would be used as it would give a firm and durable grip along the sleeve. If the same patient is receiving a lead with a soft sleeve, for example Medtronic or Biotronik, an Ethibond 2/0 suture and a Vicryl 2/0 suture will be used to suture it. The opposite end of the spectrum would be a lean, muscular man in a dual-camera device with widely spaced leads. In this situation, the risk of the lead coming out is minimal, because it is already held in tight tissue and space, and therefore the sleeve has a minor role. In such cases, the sleeves will be sutured with Vicryl only, to minimize long-term retained suture material.

Figure 2:
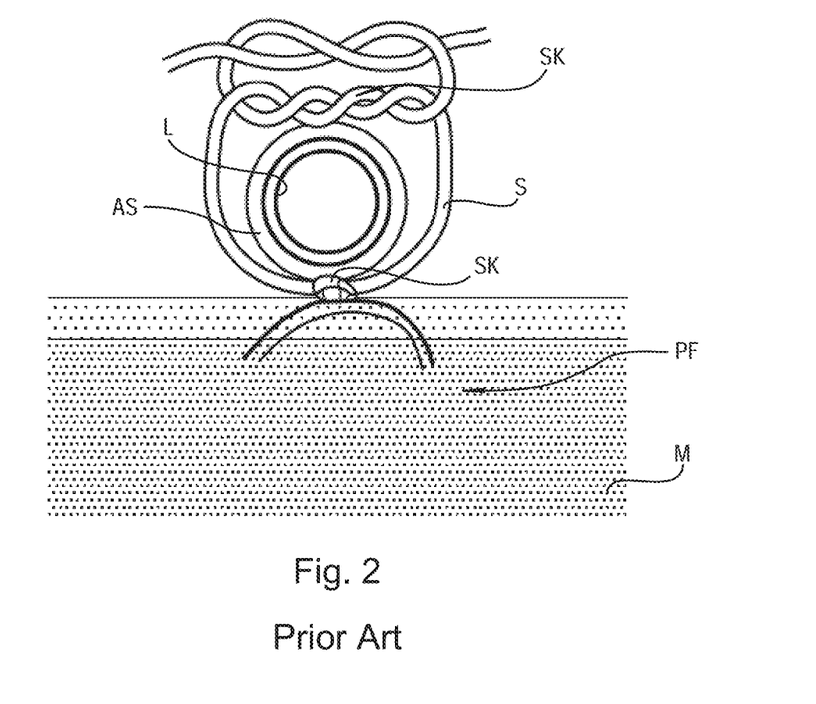
FIG. 2 shows an enlarged schematic view of the pocket floor region wherein a sleeve is sutured which helps to fix the pulse generator device according to the prior art.

Although there are different techniques for suturing the sleeve, the classic description, to conventionally fix an AS anchoring sleeve or sheath, involves first, taking a part of the PF pocket floor or base, pectoris of the major muscle—under the sleeve S that shall be at least ½ cm of incorporated muscle, as best illustrated in FIG. 2 related to prior art. A knot SK is applied to tighten the muscle bite M; this knot not be too tight, as a knot that is too tight will lead to muscle necrosis and loss of support. The absence of muscle wrinkles after tightening the knot SK will indicate that the knot is not too tight. The knot SK itself should be a square knot tight enough to keep the suture anchored to the muscle M. The knot will also prevent tension coming to the muscle once the suture is tightened over the sleeve AS.

Multiple knots in the floor should be avoided to minimize retained suture. The suture S is then placed around the sleeve AS and a knot K is applied to tighten it around the sleeve. The S suture should be placed within a groove of the sleeve AS that is just visible and near the PF floor. The knot K should be a full surgeons knot. Just before tightening the first tie, a radiologic assessment is performed to ensure that the proper length of the lead L is left inside, that is, the lead L shall be a lax curve within the cardiac shadow. If the lead needs adjustment, it is done before the knot is tightened.

Thereafter, the first tie of knot K should be applied with force, as this is the most critical knot to keep the grip of the sleeve AS to the lead L. It also has to be a surgeon's knot to ensure that it does not slip during knotting. After the first knot K, a few additional square knots are applied for security: for silk 2-3 knots and for unbraided Vicryl about 6 knots.

Thus, the first of this knot has to be a surgeon's knot to prevent slippage after the first knot. Surgeon's tie prevents slippage before next knots are applied. A single shot square knot may slip before the other knots are applied and it is therefore not recommended as the first knot. The following knots can be square knots. About 3 of these are suitable for silk, but 6 to 7 are required for unbraided Vicryl for knot security. Reversal of the direction of knots shall also be taken into account, this is essential for proper knotting, especially on slippery coated or synthetic sutures.

The role of the suture S is to help the sleeve AS to grip the L lead and keep the AS sleeve anchored to the pocket floor PF. Therefore, suture S integrity around the sleeve AS and at the pocket floor PF is necessary. Generally, the application in two grooves of the sleeve is sufficient, that is, it is not necessary to suture all three grooves unless lead stability is an extreme concern. This is necessary to minimize retained foreign material, i.e. suture material, which can increase the risk of infection. Once both sutures have been placed, a gentle tug is applied to the lead to check for proper grip. The stylet is kept inside you are ready to attach the device.

Although the devices for anchoring, implanting or fixing pulse generator devices, such as pacemakers/defibrillators, have partially proven to work in practice, this type of suture anchoring has a series of drawbacks, among which it takes a time of 2 to 4 minutes to suture the leads. Also, with the current anchoring method, the suture can be left too loose, in which case the lead can move and become loose with the risks that this entails for the patient and his/her health. In addition, the suture may be too tight, which can damage the lead or necrotize the muscle, and the corresponding corrective action must be taken to avoid future inconveniences.

In turn, several cases of erosions in the sleeve have been observed in practice, many years after implantation. One of the main causes is due to inadequate tissue depth for the sleeve. That is, the sleeve was not on the floor of the pocket. Therefore, proper sleeve placement results in a very important process, with proper wound closure being another aspect.

By virtue of the current state of the art in relation to devices and methods for anchoring devices in a patient's body, whether human or animal, for example pulse generators such as pacemakers and/or defibrillators, it would be very convenient to have a new device for fixing, anchoring or implanting these devices that may allow substituting the current suture method and carrying out their fixation in a practical, fast and easy way, optimizing surgery times, providing systematic reproducibility for the surgeon and different users, and guaranteeing a correct anchoring of the device without the drawbacks of the state of the art in terms of the fixation device being too tight or loose with its consequent postoperative problems.

BRIEF DESCRIPTION OF THE INVENTION

It is therefore an object of the present invention to provide a new method and sutureless anchoring module to fix a device, for medical use or not, in the body of a patient, be it human or animal, wherein the device can be the leads of medical devices such as pulse generators, or well known as pacemakers and/or defibrillators.

It is also another object of the present invention to provide a module that avoids the use of sutures to carry out the anchorage/implantation/fixation of the leads of the pulse generator device in the respective part of the muscle.

It is still another object of the present invention to provide a module that significantly reduces the anchoring suture time, providing consistent results, avoiding for example loose or excessive tension of the suture and knots, independently of the operator medical professional experience at the time of surgery.

It is still another object of the present invention to provide a module that provides practicality when anchoring the pulse generator device.

Still another object of the invention is an anchoring module for one or more leads, securing them to their structure and in turn, securing them to the floor of the pocket in practical, fast, easy, effective and reproducible way.

It is still another object of the present invention to provide a module that offers the possibility of practicing anchoring away from the pocket incision, without the limitations of conventional suturing.

It is still another object of the present invention to provide an anchoring module that can be used either independently or in conjunction with the conventional sleeves of the prior art, thus securing the respective leads to the floor of the pocket.

It is also another object of the present invention to provide a sutureless anchoring module for leads and catheters of medical devices, the module being of the type usable to anchor said devices in a respective part of the tissue/muscle of the human body, wherein said module comprises: at least one main housing head provided with at least one guide channel extending longitudinally along it and receiving inside at least one lead or catheter to be fixed; at least one secondary closing head provided in a lateral portion of said main housing head and which has at least one pair of unidirectional locking holes; and at least one pair of ties each of which has a first end connected to said main housing head and a steerable free end that operatively passes through a corresponding unidirectional locking hole, at least one first tie being provided to hold and fix at least one first lead or catheter in said main housing head, with a predetermined tension; and there being at least one second tie for anchoring or fixing said main housing head and said medical device in a respective muscle of the human body.

It is also an object of the invention to provide a sutureless anchoring module for the fixation of at least one device in a patient's body, wherein said module comprises:
  at least one main housing head provided with at least one housing to receive and hold inside at least a part of said device, such as lead, catheter, etc.;
  at least one secondary closing head arranged in said main housing head and which has at least a first unidirectional locking hole and a second unidirectional locking hole;
  at least one first tie having a first end connected to said main housing head and a free end designed to operatively pass through said first unidirectional locking hole and lock in said first unidirectional locking hole, to secure said part of said device within said at least one housing of the main housing head, and
  at least one second tie having a first end connected to the main housing head and a free end designed to operatively pass through said second unidirectional locking hole and lock into said second unidirectional locking hole, to hold on to a part of the patient's body.

It is still an object of the present invention to provide a method for the implantation of the sutureless anchoring module according to what is described and illustrated in the present invention, which comprises the steps of:
  i) Inserting said part of the device into said at least one housing of the main housing head,
  ii) Passing the free end of said first tie inside said first unidirectional locking hole,
  iii) Tightening and locking said first tie within said first unidirectional locking hole so as to hold said part of the device in the main housing head,
  iv) Extending said at least one second tie around said part of said patient's body,
  v) Passing the free end of said second tie inside said second unidirectional locking hole,
  vi) Tightening and locking said second tie within said second unidirectional locking hole so as to grip said part of said patient's body.

BRIEF DESCRIPTION OF THE DRAWINGS

For greater clarity and understanding of the object of the present invention, it has been illustrated in several figures, in which the invention has been represented in one of the preferred embodiments, all by way of example, wherein:

FIG. 8 shows a detailed view of a tip end of the anchoring module of the invention in a first preferred embodiment, wherein a tip can be seen with a guide to pass/thread the tip of a needle, such as a CT-1 needle or similar;

DETAILED DESCRIPTION OF THE INVENTION

Referring now to the figures, it can be seen that the invention consists of a new sutureless anchoring module for fixing or implanting a device in the body of a patient, such as leads and catheters of medical devices, particularly but not limited to pacemakers and/or defibrillators, which thanks to its structural configuration avoids the use of sutures to anchor the medical device to a part of the patient's body, such as to the muscle and/or tissue of the body of a human or animal, thus optimizing surgery times and minimizing the post-surgical risks associated with the use of this type of medical device. It should be noted that, when mentioning "medical device", mention is being made of any device for medical use or not, for control and/or treatment, for example a pulse generator or regulator such as pacemakers, defibrillators, or the like. The term "patient" refers to a human or animal individual, whether being ill or not.

Thus, and according to FIGS. 3 to 7, the anchoring module of the present invention is indicated by the general reference 1 and comprises at least one main housing head 2 provided with at least one housing which preferably comprises at least one guide channel, and more particularly a pair of guide channels 3, 4, which extend, for example longitudinally, along the main housing head 2 and which are designed to receive inside at least a part of the device to be implanted in the patient. This part of the device can be a lead or catheter to be fixed in said main head 2, or it can be a part, opening or section of the housing or cover of a device such as a pacemaker or a defibrillator. Each of said guide channels 3, 4, has at least one longitudinal cut or groove 5, 6, for example in a lower portion respectively and cause each guide channel to have a "C"-shaped cross section. The longitudinal cuts 5, 6, are made to provide a better flexible adaptation to the lead that is housed inside the guide channel in order to also facilitate its movement through it prior to being fixed. That is, the lead can be slid into the housing or guide channel to the desired position and there it can be fixed, retained, tied or held as will be explained later. Alternatively, by virtue of the cuts 5, 6, the leads or catheters, or the part or section of the device, can be inserted by exerting pressure with said part of the device in the cut 5, 6, which will open and allow said part of the device, lead or catheter to pass into the guide channel.

Figure 3:
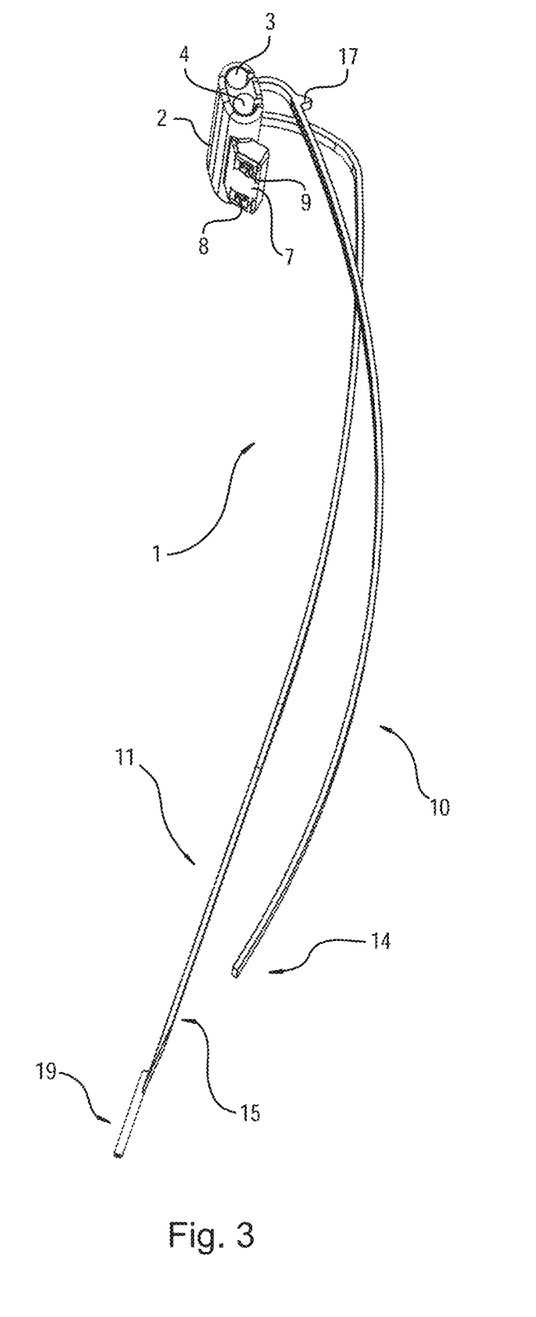
FIG. 3 shows a lateral perspective view of the anchoring module according to the present invention.
Figure 4:
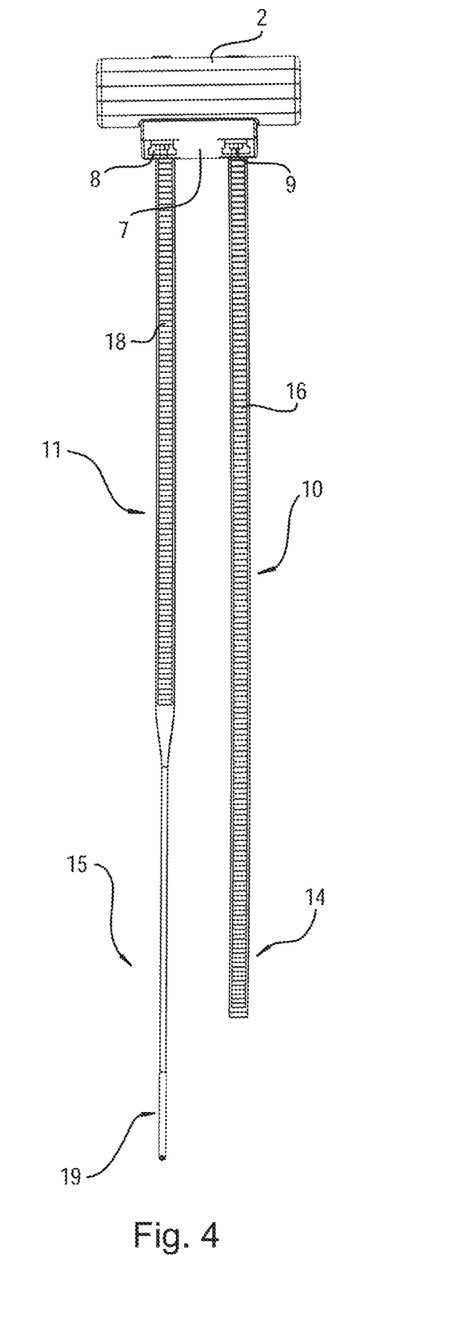
FIG. 4 shows a top plan view of the anchoring module according to the present invention.
Figure 5:
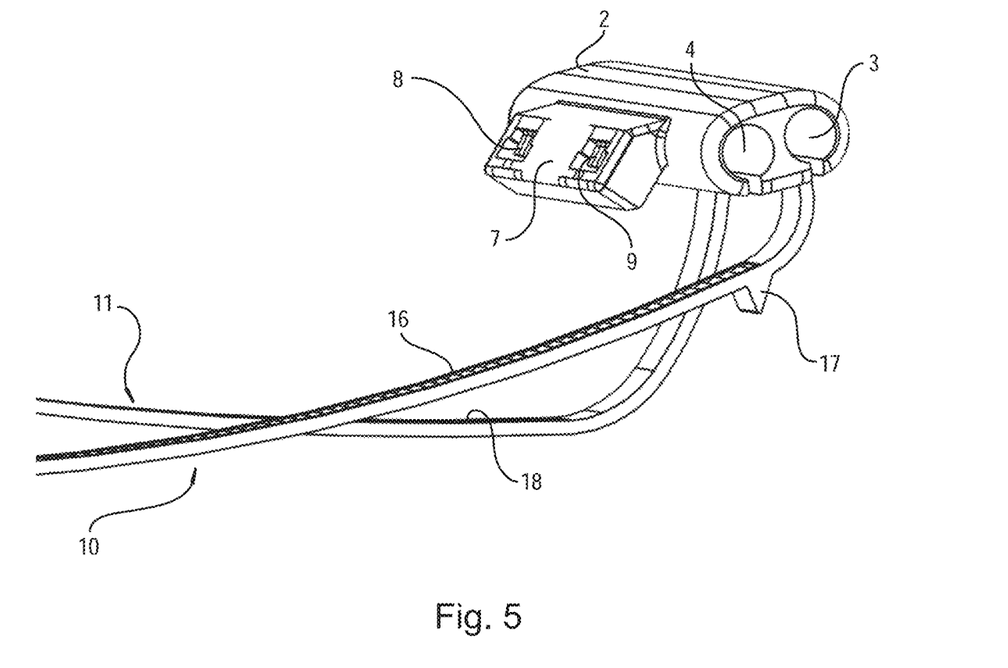
FIG. 5 shows an enlarged perspective view taken from the front and left side of the device of the anchoring module of the present invention.
Figure 6:
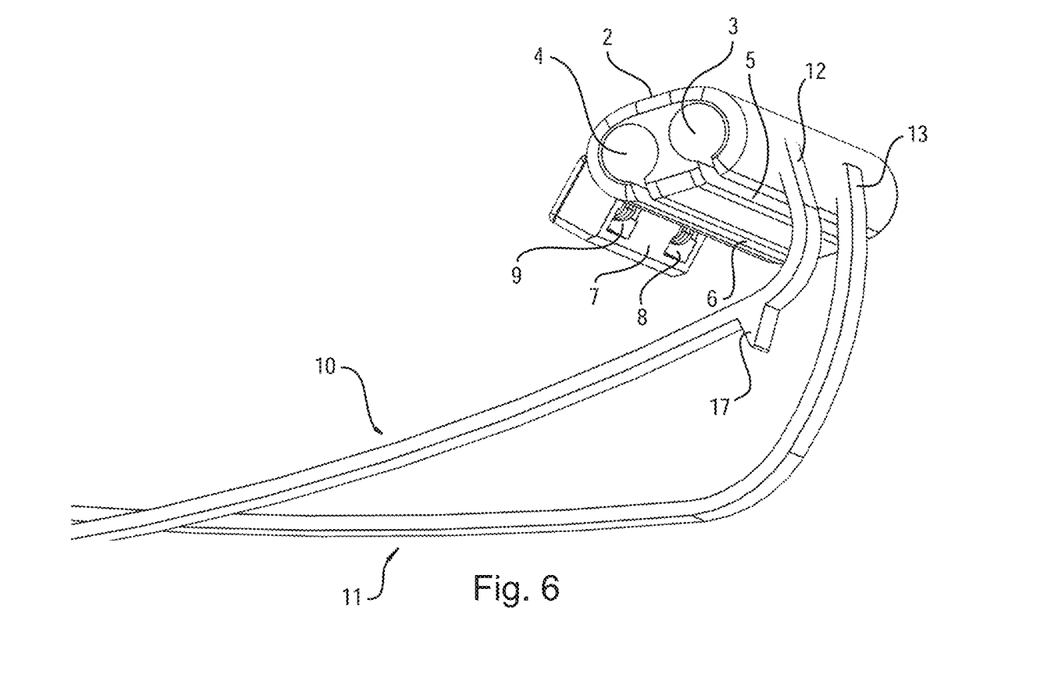
FIG. 6 shows an enlarged perspective view taken from the front and right side of the anchoring module of the present invention.
Figure 7:
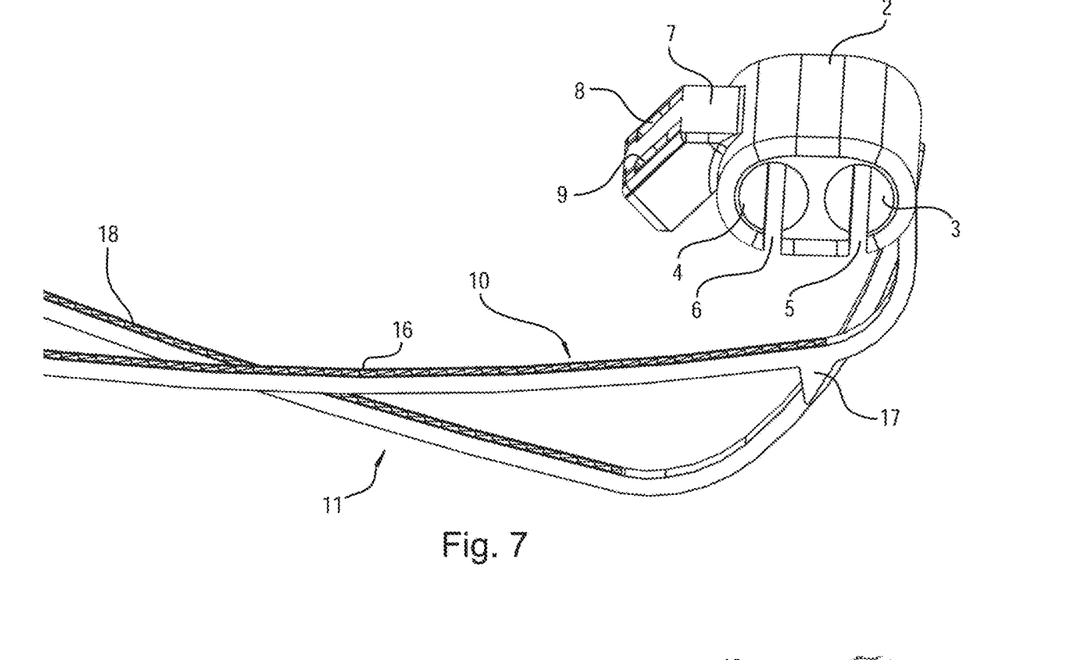
FIG. 7 shows an enlarged and side view of the front and superior aspect of the anchoring module according to the present invention.

Although, in the present invention, two guide channels 3, 4 have been illustrated that extend longitudinally along the main housing head 2 and that each receive in their interior at least one lead or catheter to be tied, fixed or retained. This does not imply that the invention is limited to said configuration, but the main housing head 2 of the invention may be designed to have one or more guide channels and have other shapes depending on the part of the device that must be retained within each housing 3, 4.

On the other hand, the module of the invention comprises at least one secondary closing head 7 provided in a lateral portion of said main housing head 2 and which has at least one pair of unidirectional locking holes 9, such as a first hole 9 and a second hole 8. Likewise, at least one pair of ties is provided, that is a first tie 10 and a second tie 11, each of which has a respective first end 12, 13 fixed, joined and/or connected in said main housing head 2 and a free end 14, 15 that is steerable and that is designed to operatively pass through a corresponding unidirectional locking hole 8, 9 of the secondary closing head 7. The first tie 10 is designed to pass and lock inside the first hole 9 and the second tie 11 is designed to pass and lock inside the second unidirectional locking hole 9. Each hole 8, 9 is provided inside with a locking design which can be conventional, to lock on ties 10, 11.

More particularly for the invention, but not being limiting, the at least first tie 10 is provided to hold and fix at least a part of the device to be implanted, for example a first cable or catheter, in said main housing head 2, and said at least one second tie 11 is designed to traverse or grip around a part of the patient's body, for anchoring or fixing said main housing head 2 and said medical device in said part of the patient's body, such as a respective muscle/tissue of the patient. Wherein, said first tie 10 provided to hold and fix at least one first lead or catheter, comprises a selective locking face 16 provided with a plurality of teeth that are staggered and operatively locked in a corresponding hole of said unidirectional locking holes 8 or 9, and a rear face provided with at least one adjustment stop 17 that comes into contact with a perimeter portion of the corresponding locking hole 9 of said secondary closing head 7.

It should be noted that the locking system generated between the plurality of teeth of the selective locking face 16 and the corresponding unidirectional locking hole 8 or 9, can be any locking system, for example of the type used in security seals but not limiting to this, allowing the first tie to pass through it in a given direction but not allowing its return, that is, allowing a unidirectional passage so that the tie locks in a desired position according to the requirements without the risk that it could loosen and come out of the respective locking hole of the secondary closing head 7. In turn, the arrangement of the adjustment stop 17 will allow an adequate and correct adjustment of the lead in said guide channel 9, in a reproducible manner independent of the operator, in order to avoid a very tight or very loose adjustment with the risks that this entails.

In turn, it is highlighted that the position of the adjustment stop 17 in the first tie 10 will depend on and adapt to the measurements of each anchoring module and of the leads to be anchored/fixed. Likewise, one or more anchoring ties 10 for leads or catheters can be provided without any inconvenience, making the respective modifications to the secondary closing head so that each tie corresponds to a respective unidirectional locking hole. In this way, it is possible to have more than one tie as the first tie 10, with its selective locking face and adjustment stop that can vary its position depending on the lead or leads/catheters or part of the device to be fixed.

For its part, said at least one second tie 11 for anchoring or fixing the main housing head 2 and medical device in a respective muscle of the patient's body, comprises a selective locking face 18 provided with a plurality of teeth that are staggered and operatively locked in the other unidirectional locking hole 8. By way of example, but not limiting for the invention, according to what is illustrated in FIGS. 3 to 7, the unidirectional locking hole 8 is going to match with said second tie 11, while the unidirectional locking hole 9 is going to match with the first tie 10, again this is not limiting for the invention since the number of ties of the first tie 10 type can vary, also varying the number of corresponding unidirectional locking holes. In turn, the fact of mentioning them as first and second ties, and first and second locking holes is merely exemplary to simplify the understanding of the present invention, its ordinal reference being indifferent in practice.

As in the case of the first tie, the locking system generated between the plurality of teeth of the selective locking face 18 of the second tie 11 and the corresponding unidirectional locking hole 8 or 9, can be any locking system, for example, such as those used in security seals, but this is not limiting, that may allow the second tie to pass through it in a given direction but may not allow its return, that is, that may allow an unidirectional passage so that the tie locks in a desired position according to the requirements without the risk that it could loosen and come out of the respective locking hole of the secondary closing head 7. Likewise, it is possible to have one or more ties of the type of the second tie 11, with their corresponding unidirectional locking holes in the secondary closing head 7 without any inconvenience.

Figure 8:
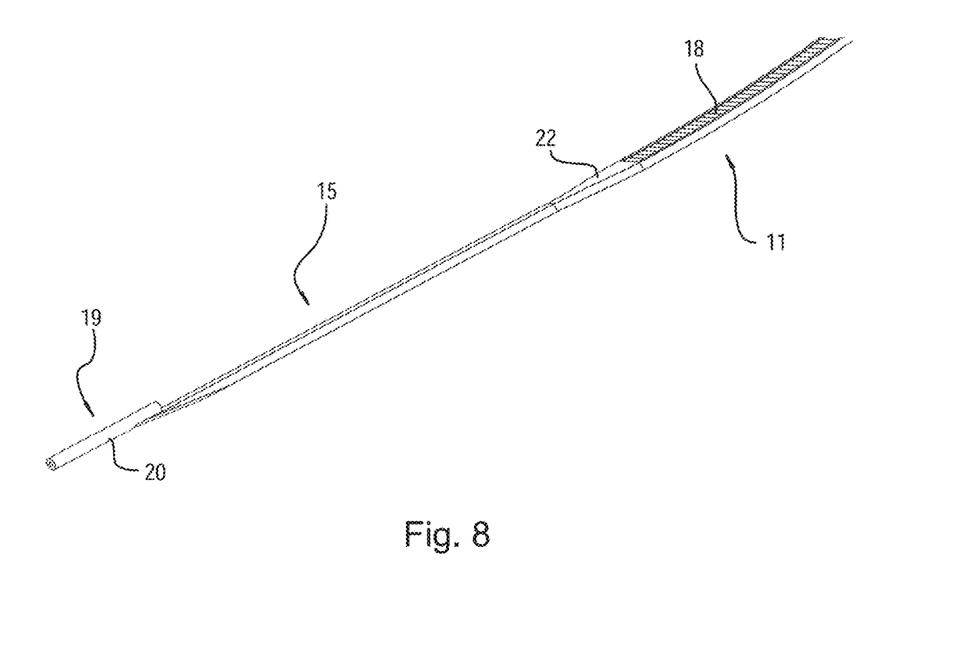
Figure 9:
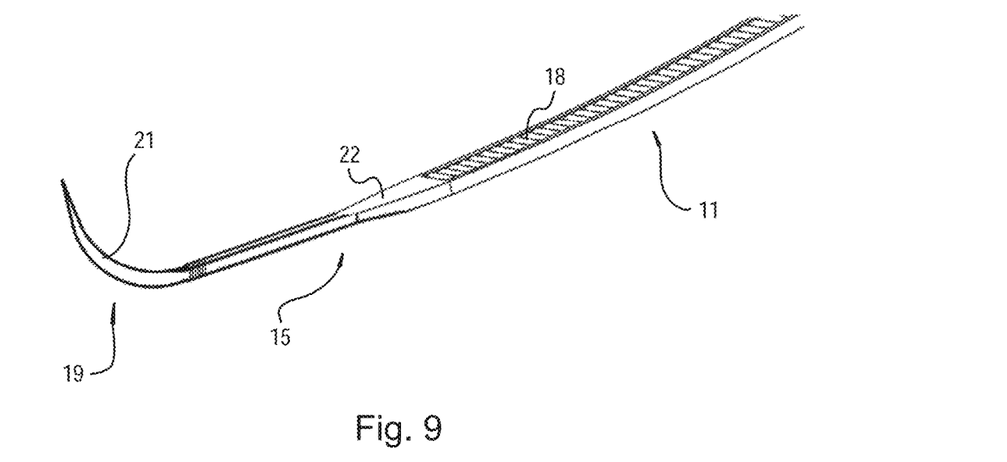
FIG. 9 shows a detailed view of a tip end of the anchoring module of the invention in a second preferred embodiment, wherein it can be seen that the tie has needle-shaped tip incorporated to the tie material.

On the other hand, the free end 15 of said second tie 11 may comprise a tip 19 selected from a tip with a guide to receive a needle, such as a CT-1 needle, or the like, or a needle-shaped tip incorporated into the material of the tie, this being not limiting for the invention since other forms of tips can be considered and used without any inconvenience. In a first preferred embodiment, said tip 19 is a tip with a CT-1 or similar needle guide 20 as illustrated in FIG. 8. In a second preferred embodiment, said tip 19 is a tip shaped like a needle incorporated into the material of the tie 21 as best illustrated in FIG. 9. In both cases, the tip 19 can be made of a known conventional surgical material or be made of a plastic material selected from but not limited to the biocompatible group, for example: Polytetrafluoroethylene (PTFE)) from the PEEK group (Poly-Ether-Ether-Ketone).

The tip 19 has a needle incorporated to the material of the tie to allow and facilitate the process of passing the tie through the part of the patient's body where it is desired to fix the lead, catheter or section of the device. This part of the patient's body can be a tissue, muscle, or limb of the patient, wherein the module of the invention is to be anchored or fixed in conjunction with the part of the respective device against the corresponding muscle of the human body. That is, by means of the second tie 11, the module and part of the device will be anchored without the use of conventional sutures, minimizing the risk of complications after surgical intervention. In this way, the module of the invention, together with the medical device, remain anchored in the patient's muscle, without the use of conventional sutures. The anchorage will preferably be made at the place of insertion of the leads or catheters of the device.

It should be noted that the sutureless anchoring module for medical devices according to the present invention considers the use of a biocompatible plastic material selected from the group consisting of, but not limited to, Polytetrafluoroethylene (PTFE)) of the PEEK (Poly-Ether-Ether-Ketone) group.

The plastic material used for the module of the invention is sterilized for human and/or animal use, regardless of whether it is for internal or external use in the patient.

In accordance with the invention, there is also provided a method for implanting a device in the body of a patient by means of the sutureless anchoring module of the present invention. The method of the invention does not consider describing the previous steps to carry out the incision and arrangement of the surgical guide elements that allow the implantation of the medical device, since these steps are well known in the field of art. Once this has been clarified, and it being understood that the starting point is from the incision made and with the guide instruments already in position, the novel steps corresponding to the method of the invention will be described below.

The method of the present invention is aimed at implanting, fixing or installing a device in a part of the body of a patient by means of the sutureless anchoring module that has been described and illustrated, and comprises the steps of:

i) Inserting a part, for example the leads or catheters, of the device into the housing formed by the guide channels 3, 4, of the main housing head 2, ii) Passing the free end 14 of said first tie 10 inside said first unidirectional locking hole 9.

iii) Tightening and locking said first tie 10 inside said first unidirectional locking hole 9 in order to hold said part of the device in the main housing head 2. Said holding is improved by virtue of the cuts 5, 6 that give the guide channels 3, 4 a tightening or holding elasticity.

iv) Extending said at least one second tie 11 around said part of said patient's body, the part of which may be tissue, muscle or a limb of the patient. This can be done by traversing said tissue or muscle or by encircling said muscle or limb of the patient.

v) The tip end of the tie 15 is then to be cut at site 22 allowing passing of the free end 15 of said second tie 11 inside said second unidirectional locking hole 8. If the tie 11 shall pass through the patient's tissues, it is convenient that the free end 15 includes a needle or has the shape of a needle.

vi) Tightening and locking said second tie 11 within said second unidirectional locking hole 8 so as to be gripped at said part of said body of the patient.

Figure 10:
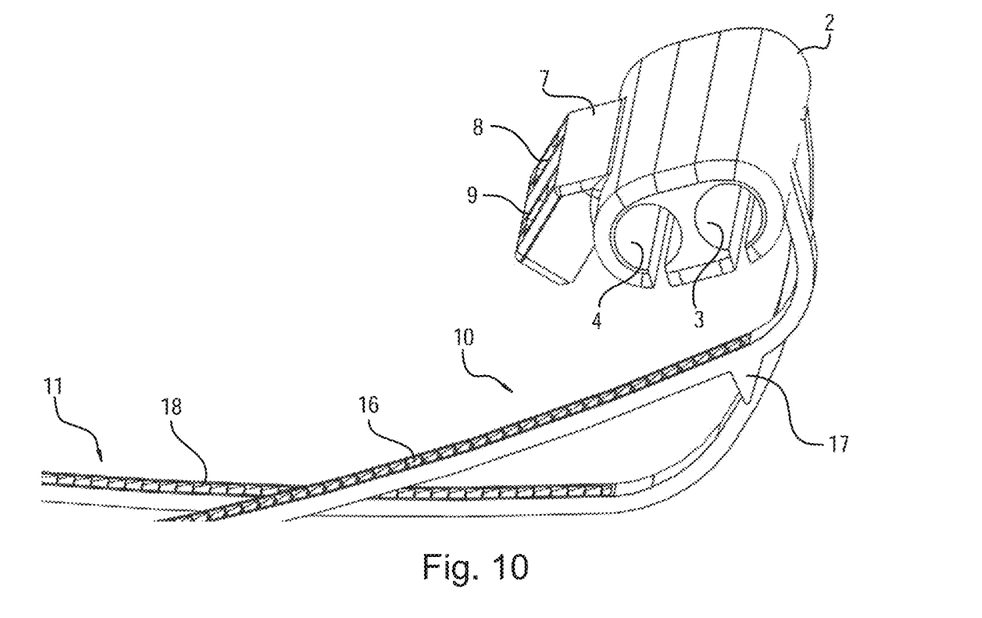
FIGS. 10 to 13 show by way of example different steps for the method of anchoring or implanting the leads to the floor of the pocket by means of the anchoring module of the present invention.
Figure 11:
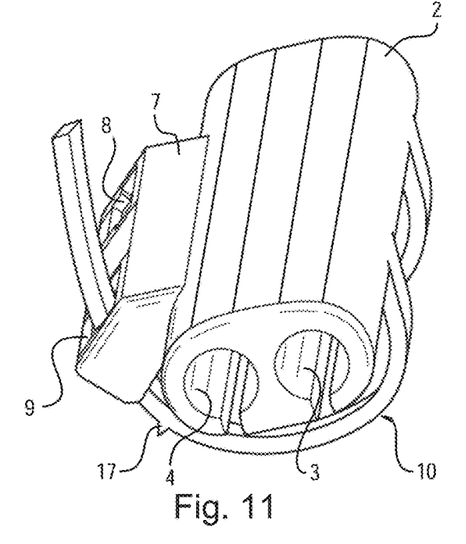
Figure 12:
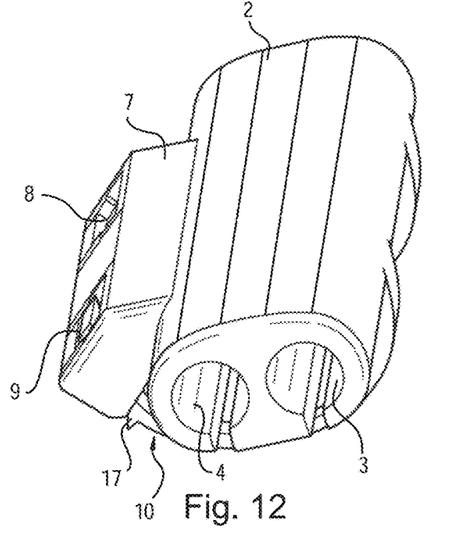
Figure 13:
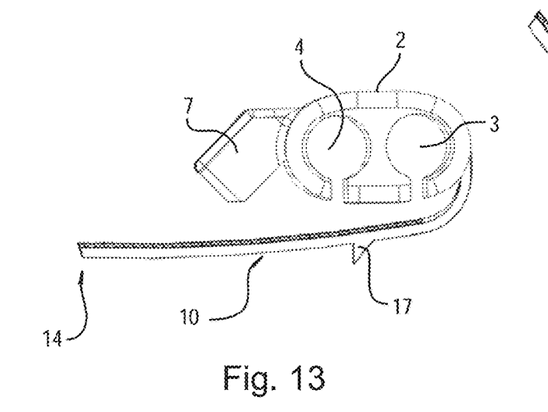
Figure 14:
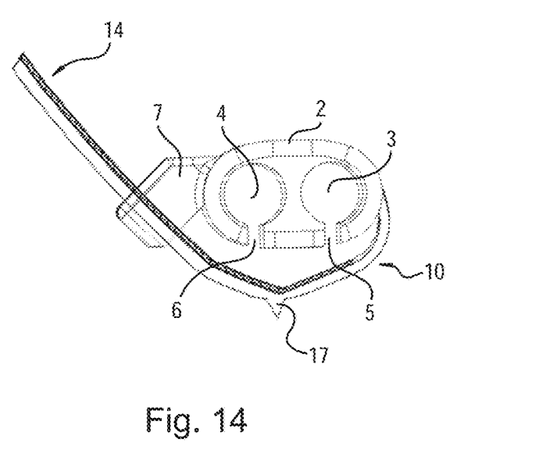
FIGS. 14 to 16 show schematically, and by way of example also, the steps for the method of anchoring or implanting the leads to the floor of the pocket by means of the anchoring module of the present invention.
Figure 15:
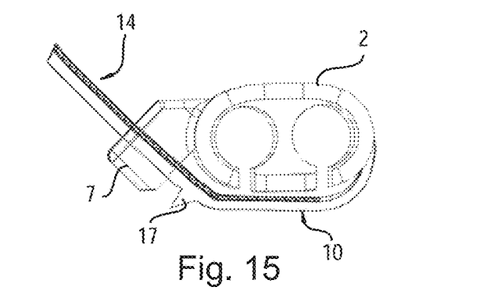
Figure 16:
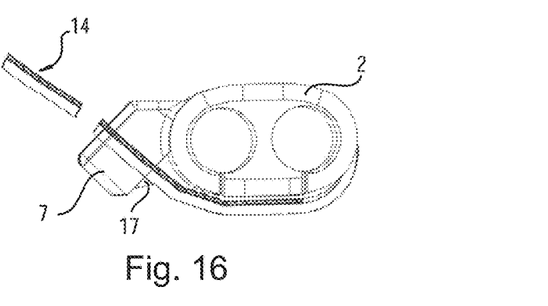

More particularly, the method of the invention may comprise: First step, fixing the lead to the module, which includes the following steps:

a) firstly connecting at least one end of at least one lead to the corresponding part of the heart;

b) connecting the module to the exposed lead (leads) beyond the insertion site, locating said lead within at least one guide channel 3-4. Advance module 2 on the lead to the site of its muscular insertion.

c) by means of said first tie 10, enveloping by holding the corresponding portion of the lead around the main housing head 2. In FIGS. 10 and 13 the initial position of the module of the invention and of the first tie 10 which is going to fix the respective leads/catheters to the body of the main housing head, can be seen schematically.

d) passing the free end 14 of said first tie 10 through the corresponding unidirectional locking hole 9 of the secondary closing head 7, as schematically illustrated in FIGS. 11 and 13, wherein the leads and the muscle of the human body have not been illustrated to facilitate the understanding of the object of the present invention;

e) tightening said first tie 10 so that the lead being held is neither too tight nor too loose as illustrated in FIGS. 11 and 15. This is achieved by tightening the tie 10 until adjustment stop 17 comes into contact with the periphery of the unidirectional locking hole 8 as best illustrated in FIGS. 12 and 16;

f) cutting the excess portion of the first tie 10 that protrudes beyond the secondary closing head 7 as illustrated in FIG. 16;

It can be seen in the sequence of steps of FIGS. 13 to 16, that as the first tie 10 is tightened by the locking system defined between the unidirectional locking hole 9 and the plurality of locking teeth of the selective locking face 16, the physical space defined by the longitudinal cut 5, 6 of the guide channels 3, 4, closes in such a way as to hold the respective lead/s that are inside, in order to hold them firmly without tightening them too tight or leave them loose by virtue of the adjustment stop 17 that regulates said adjustment intensity. Thus the use of sleeves is avoided, this not limiting to the invention, since the invention can be adapted to be used with said conventional anchoring devices such as sleeves. It is emphasized again that the position of the adjustment stop 17 may vary depending on the number of leads or the diameter of the leads to be fixed. Second Step: fixation of the unit, cable-module, to the muscle, which includes the following steps:

g) Passing the tip of a CT-1 needle or similar, according to the operator's preference, through the guide/pin 19 provided at the free end 15 of the second tie 11. Passing the needle carrying the tie in the shape of a tie at least 1 cm through the corresponding muscle of the human body, in order to anchor the module to said muscle; in order to anchor the main housing head of the module 1 next to the medical device in said muscle;

h) Cutting the distal segment or site 22 of the tie needle (FIGS. 8, 9) and passing the free end of said second tie through the remaining unidirectional locking hole, tightening the main housing head to the respective muscle; until the muscle is indented;

i) passing the free end 15 of said second tie 11 through the remaining unidirectional locking hole 9, tightening the main housing head until the muscle is indented; cutting the excess portion of the i) second tie 11 that projects beyond the secondary closing head 7; and k) connecting the free end of the lead to the medical device.

After the anchoring of the module of the invention in conjunction with the medical device in the corresponding part of the human body muscle, the subsequent operational steps are carried out for the control, regulation, monitoring, removal and closure of the incision. It should be noted that the process for fixing and tightening the second tie 11 is similar to that of the first tie 10, and for such reasons it has not been illustrated, it being understood that it can be interpreted by any expert in the field, bearing in mind exceptions and constructive differences between one tie and another one.

Of note if at any time the operator/surgeon were to decide repositioning a lead or the module, would proceed to cut any of the ties already engaged in the unidirectional holes 8, 9 at the base of the closing head 7, to avoid any lead damage. Subsequently the leads would be easily removed from the guide channel 3, 4 through the groove 5, 6. The used module is to be discarded and a new one would be used repeating the described above anchoring operation.

As is known in the field of the invention, the time of conventional processes using conventional devices amounts to 2-5 minutes to perform the respective sutures of leads. On the other hand, by way of example but not limiting for the invention, by means of the module of the present invention said time is reduced to around 30 seconds, which means a notable advantage in surgery times compared to the prior art.

Thus, the module of the present invention avoids the use of conventional devices that use sutures for the fixation of medical devices. It is emphasized that the module of the invention can be considered and adapted to be used independently or in conjunction with related devices used today in the practice of implanting pacemakers and/or defibrillators without any inconvenience. That is, the module of the invention can be used in conjunction with conventional sleeves as well as with any anchoring method that uses sutures.

FIGURES REFERENCES

AS Anchoring sleeve
H Heart
L Lead
M Muscle
PF Pocket Floor
PGD Pulse Generator Device
PZ Pectoral Zone
SK Surgeon Knot
1 Anchoring module
2 Main housing head
3 Guide channel
4 Guide channel
5 Longitudinal cut or groove channel 3
6 Longitudinal cut or groove channel 4
7 Secondary closing head
8 Unidirectional locking hole
9 Unidirectional locking hole
10 First Tie (anchoring lead)
11 Second Tie (needle loop anchoring to tissue)
12 Fixed end of first tie, joined/connected to main housing head
13 Fixed end of second tie, joined/connected to main housing head
14 Free end of first tie
15 Free end of second tie
16 Selective locking face with a plurality of teeth tie 10
17 Stopper
18 Selective locking face 18 with plurality of teeth tie 11
19 Tip of tie 19 with a guide to receive a needle (i.e. CT-1)
21 Needle incorporated into the material of the tie
22 Cutting site distal segment of the needle tie 11

I claim:

1. A sutureless anchoring module for the fixation of at least one device in a body of a patient, wherein said module comprises:
   at least one main housing head provided with at least one housing to receive and hold inside at least a part of said at least one device;
   at least one secondary closing head arranged in said main housing head and which has at least a first unidirectional locking hole and a second unidirectional locking hole;
   at least one first tie having a first end connected to said main housing head and a free end designed to operatively pass through said first unidirectional locking hole and lock in said first unidirectional locking hole, to secure said part of said at least one device within said at least one housing of the main housing head; and
   at least one second tie having a first end connected to the main housing head and a free end designed to operatively pass through said second unidirectional locking hole and lock into said second unidirectional locking hole, to hold on to a part of the body of the patient, wherein
   said at least one housing of the main housing head comprises at least two guide channels extending longitudinally along the main housing head,
   each of said at least two guide channels has at least one longitudinal cut such that each of said at least two guide channels has a "C"-shaped cross section, and
   said at least a part of said at least one device is selected from the group consisting of a lead and a catheter, and each of said at least two guide channels receives one of said lead and catheter.

2. The sutureless anchoring module of claim 1, wherein said first and second ties each comprise a selective locking face provided with a plurality of teeth that engage stepwise and operatively in said first and second unidirectional locking holes respectively.

3. The sutureless anchoring module of claim 2, wherein the first tie has a rear face provided with at least one adjustment stop for coming into contact with a perimeter portion of the corresponding first unidirectional locking hole of said secondary closing head.

4. The sutureless anchoring module of claim 2, wherein the free end of said second tie comprises a tip selected from the group consisting of a tip with a guide to receive a needle and a needle-shaped tip.

5. The sutureless anchoring module of claim 1, wherein the module is made of at least one biocompatible plastic material selected from the group consisting of Polytetrafluoroethylene and Poly-Ether-Ether-Ketone.

6. The sutureless anchoring module of claim 1, wherein said at least one device is a pacemaker and said part of said at least one device is at least one lead that is retained within said at least one housing of the main housing head.

7. A method for implanting the sutureless anchoring module according to claim 1, comprising the steps of:
   i) inserting said at least a part of the at least one device into one of said at least two guide channels one housing of the main housing head;
   ii) passing the free end of said first tie inside said first unidirectional locking hole;
   iii) tightening and locking said first tie within said first unidirectional locking hole so as to hold said at least a part of the at least one device in the main housing head;
   iv) extending said at least one second tie around said part of the body of the patient;

v) passing the free end of said second tie inside said second unidirectional locking hole; and vi) tightening and locking said second tie within said second unidirectional locking hole so as to be gripped at said part of the body of the patient.

8. The method of claim 7, wherein after the step of tightening and locking said first tie within said first unidirectional locking hole, it further comprises the step of cutting any part of the free end of said first tie that exceeds outside said first unidirectional locking hole.

9. The method of claim 7, wherein after the step of tightening and locking said second tie within said second unidirectional locking hole, it further comprises the step of cutting any part of the free end of said second tie that exceeds outside said second unidirectional locking hole.

10. The method according to claim 7, wherein prior to step i) an incision is made on the body of the patient and said at least one device is inserted through the incision.

11. The method according to claim 10, wherein said at least one device is inserted into said incision and said step i) comprises inserting at least one lead of said at least one device inside one of said at least two guide channels of the main housing head.

12. The method according to claim 7, wherein said at least one device is selected from the group consisting of a pacemaker and a defibrillator.

\* \* \* \* \*